US006928411B1

(12) United States Patent
Fox et al.

(10) Patent No.: US 6,928,411 B1

(45) Date of Patent: Aug. 9, 2005

(54) INVOICE PROCESSING SYSTEM

(75) Inventors: Vincent P. Fox, Vestal, NY (US); Joy T. Garris, Binghamton, NY (US); Scotty J. Reynolds, Flower Mount, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/409,831

(22) Filed: Sep. 30, 1999

(51) Int. Cl.[7] .......... G06F 17/60

(52) U.S. Cl. .......... 705/1; 705/28

(58) Field of Search .......... 705/30, 40, 29, 705/75, 28, 22; 700/236, 107, 99; 235/385

(56) References Cited

U.S. PATENT DOCUMENTS

| | | | | |
|---|---|---|---|---|
| 4,621,325 | A * | 11/1986 | Naftzger et al. | |
| 4,791,281 | A * | 12/1988 | Johnsen et al. | |
| 4,851,999 | A * | 7/1989 | Moriyama | 705/30 |
| 4,887,207 | A * | 12/1989 | Natarajan | |
| 5,475,833 | A * | 12/1995 | Dauerer et al. | 705/35 |
| 5,615,109 | A * | 3/1997 | Eder | |
| 5,638,519 | A * | 6/1997 | Haluska | |
| 5,712,989 | A * | 1/1998 | Johnson et al. | |
| H1743 | H * | 8/1998 | Graves et al. | |
| 5,870,717 | A * | 2/1999 | Wiecha | 235/385 |
| 5,913,210 | A * | 6/1999 | Call | 705/20 |
| 6,070,150 | A * | 5/2000 | Remington et al. | 705/40 |
| 6,115,690 | A * | 9/2000 | Wong | 705/30 |
| 6,505,215 | B1 * | 1/2003 | Kruglikov et al. | 707/201 |
| 6,532,480 | B1 * | 3/2003 | Boothby | 707/201 |

FOREIGN PATENT DOCUMENTS

JP 408301411 A * 11/1996

OTHER PUBLICATIONS

"Three Way Match Requirement for All Procurement Component Payments" Minnesota Department of Finance and Administration; Operating Policy and Procedure; No. 0803-05; Date: Jun. 29, 1995, p. 1-2.*

Japanese Abstract JP 11222305.*

Paying a CSO Doc Type; Minnesota Departments of Finance and Administration; Internet printout, Jul. 17, 1997.*

Create a Central Stores Order for Stocked Merchandise; Minnesota Departments of Finance and Administration; Internet printout, Jul. 17, 1997.*

Case Study on Exceptions; Saastamoinen; 1995; Information Technology & People v8n4 PP: 48.*

Heiko Maus, "Integration of a DAU-System in Workflow Management Systems", Business Process & Workflow Conference, Genevea, Switzerland, Oct. 1998, pp. 1-4.

* cited by examiner

*Primary Examiner*—John G. Weiss
*Assistant Examiner*—Igor N. Borissov
(74) *Attorney, Agent, or Firm*—William E. Schiesser; Hoffman, Warnick & D'Alessandro LLC

(57) ABSTRACT

Invoices for goods purchased under a pricing strategy of goods receipt base invoice verification are processed. A matching tool performs a logical three-way match between invoices, and a database tool having goods received receipts and purchase orders. A transfer tool sends the invoices and results of the three-way match to the database when a match is found.

9 Claims, 3 Drawing Sheets

INVOICE PROCESSING SYSTEM

TECHNICAL FIELD

The invention relates to an invoice processing system. In particular it relates to a system for performing a logical three-way match between an invoice, goods received receipts, and purchase orders. The results of the logical matching are then transferred to a database tool containing the goods received receipts and purchase orders.

BACKGROUND OF THE INVENTION

In the process of manufacturing a finished product, various raw materials or parts must be ordered from suppliers, received, and the suppliers paid. In general the party doing the manufacturing will want to minimize the inventory of such goods consistent with a strategy that permits reaction to demand changes and prevents exhausting their supply on hand which could otherwise cause production stoppage. Accordingly, an efficient system for handling the paperwork or electronic documents associated with the ordering, receiving, and paying for goods is needed to permit whatever inventory strategy is needed to operate in a facile manner. When a large number e.g. thousands of different goods must be handled by this system as is typical in many manufacturing industries today, improvements in the operation of the document system can provide significant advantages to a manufacturer.

A company normally orders goods by sending a purchase order, document hereinafter called a purchase order, to a supplier listing the goods ordered, their quantity, desired delivery date, and a previously agreed-to price. Other data may also be part of the purchase order. It is also well known in the art to send the purchase order by mail, fax, e-mail, or electronically such as over telephone lines using a technology known as EDI 850. If sent in hardcopy form by mail or fax, the purchase order may be entered into a database manually using a keyboard, mouse pointer, touch screen or such devices which are commonly used to enter data. It is also known to enter purchase orders electronically through the internet using techniques generically known as e-business. Both the company and supplier typically keep a copy either in electronic or hardcopy form for their records.

In general procurement and many other procurement environments, the price paid after delivery is based on the purchase order, a process referred-to as GR/IR. However, it is also known in the procurement arts to use a pricing strategy based on validity dates with control indicators such as ship date, delivery date, and goods receipt date. This strategy usually requires purchase orders to be set up as good receipt base invoice verification, referred to as GR/IV. In this case the actual price to be paid is not determined until after the goods are received.

Regardless of the pricing strategy, the supplier sends an invoice to the company requesting payment. This is usually sent using the same techniques described above for sending purchase orders. Often the invoice arrives for processing before a corresponding goods received receipt(GRR). The GRR may also be called a packing list, bill of lading, shipper or preferably delivery note. The processing of the invoice prior to receipt of goods must necessarily be handled differently when a GR/IV pricing strategy is used. In particular, based on various accounting rules, no processing is possible with such GR/IV invoices as compared to GR/IR. The necessity of having two invoice processing systems is for large companies costly and error prone. It would therefore be an improvement in the art of invoice processing to be able to process GR/IV invoices in a facile manner and in a manner which utilizes GR/IR processing capability which is usually available and operating effectively in a company.

OBJECTS AND SUMMARY OF THE INVENTION

It is therefore, a principal object of the present invention to enhance the invoice processing art by providing a processing system with enhanced capabilities.

It is another object to provide a method of processing invoices which can be accomplished in a facile manner.

It is yet another object to provide a data processing apparatus with enhanced capability for processing invoices.

It is a further object to provide a computer program product for enhanced processing of invoices.

It is another object to provide computer executable process steps for performing enhanced invoice processing.

These and other objects are attained in accordance with one embodiment of the invention wherein there is provided an invoice processing system, comprising, entry means for entering and storing invoices, a database tool having one or more goods received receipts and one or more purchase orders, matching tool means coupled to the entry means and the database tool for periodically inquiring the database tool to determine if a new goods received receipt is present, performing a logical three-way match between each invoice, the one or more goods received receipts, and the one or more purchase orders, including generating logical results of the three-way match, and a transfer tool for transferring the logical results from the matching tool means to the database tool, including transferring each stored invoice for which a match was found by the matching tool means.

In accordance with another embodiment of the invention—there is provided a method of processing invoices, comprising the steps of, entering and storing invoices in an invoice processing tool, providing a database tool having one or more goods received receipts and one or more purchase orders, periodically inquiring the database tool to determine if a new goods received receipt is present, performing a logical three-way match between each invoice, the one or more goods received receipts, and the one or more purchase orders including generating logical results of the three-way match, and transferring the logical results from the invoice processing tool to the database tool including transferring each stored invoice for which a match was found by performing the logical three-way match.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
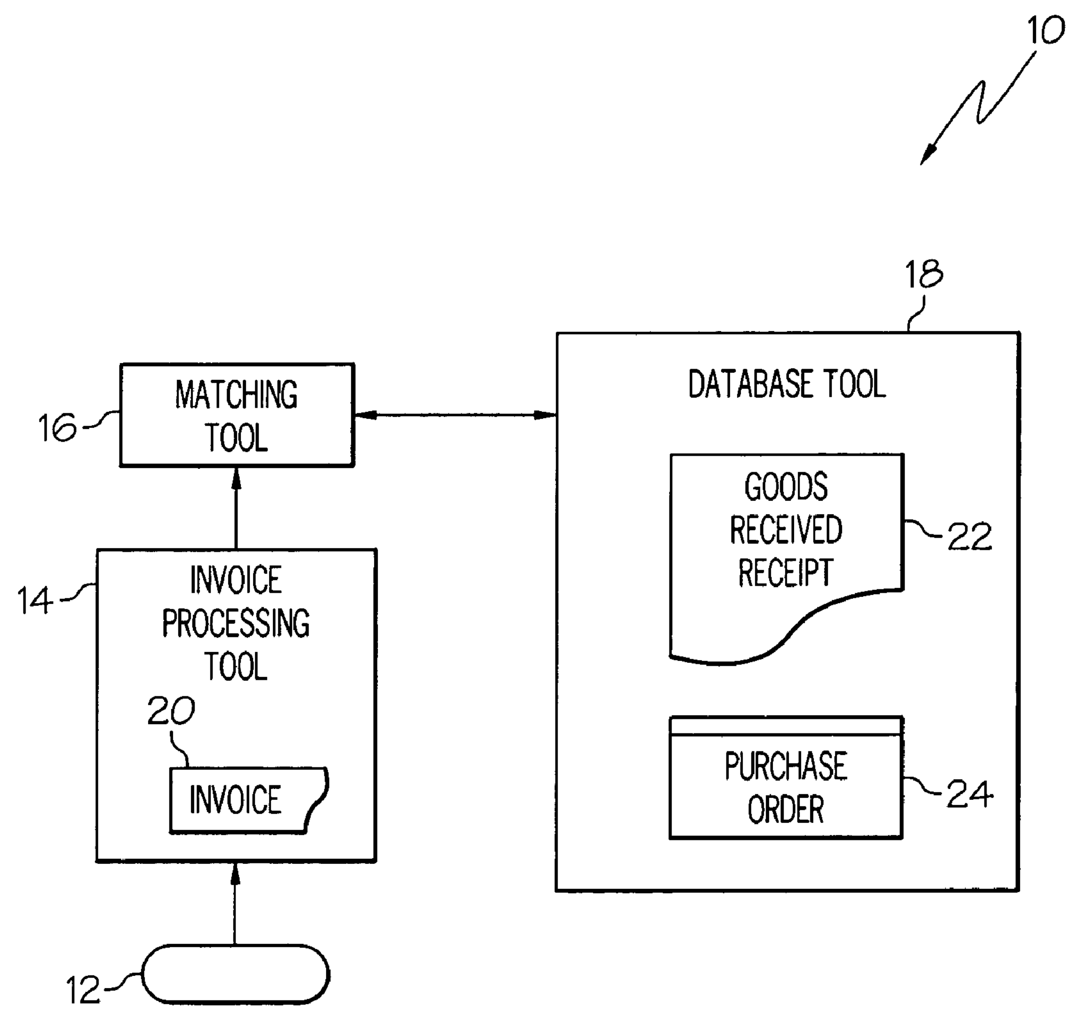
FIG. 1 illustrates the elements of one embodiment of the invention.

In FIG. 1 there is shown an invoice processing system 10. Entry means 12 and 14 are used for entering and storing invoices 20. The invoice may be received electronically via EDI 850, e-mail, or other electronic connection and entered automatically without manual intervention. It may also be entered manually after receipt in hardcopy form via mail, fax, overnight express or courier delivery. Manual entry may use keyboard, mouse or trackball pointer, touch screen or other methods known in the data processing arts. Invoices 20 are stored in a computer memory which may be an active memory such as DRAM, SRAM, FLASH or EPROM. The invoices may also be stored on a hard disk, floppy disk, CD ROM, DVD or any other storage medium.

Database tool 18 has one or more goods received receipts 22 and one or more purchase orders 24. The database tool may be a computer based software tool having two databases, one for the goods receipts 22 and a second for the purchase orders 24. Database tool 18 may be a custom designed tool appropriate to the company in which it is used, or it may be any commercially available purchasing tool capable of having one or more goods received receipts 22 and one or more purchase orders 24. The SAP, B2B, procurement tool available from the SAP AG Company of Neurottstrasse 16 69190 Waldorf, Germany is one such purchasing tool.

Matching and transfer tool 16 is coupled to both the invoice entry-processing tool 14 and database tool 18. It is preferably a software tool which may run on the same processor as either or both tools 16 and 18 but may also run on a separate or remote processor. The matching tool 16 periodically inquires database tool 18 to determine if a new goods received receipt is present.

Matching tool 16 may also comprise specially designed matching hardware or any combination of hardware and software capable of performing a matching function between two or more numbers or variables. In particular, matching tool 16 is capable of performing a three-way match such as will be described below in connection with FIG. 3.

For each invoice for which a match is found, transfer tool 16 transfers the invoice from storage in the invoice entry tool 14 to database tool 18 along with the results of the logical three-way match. Transfer may be done with software read, move, and store instructions in the case where all three tools, the invoice tool, transfer tool, and database tool are running on a shared processor. Transfer may also be done over a communicating connection such as a LAN, telephone line, link, or radio frequency waves, when one or more of the three tools is located remotely. Database tool 18 may then proceed to authorize payment to the vendor or perform other processing tasks well known in the procurement arts.

Figure 2:
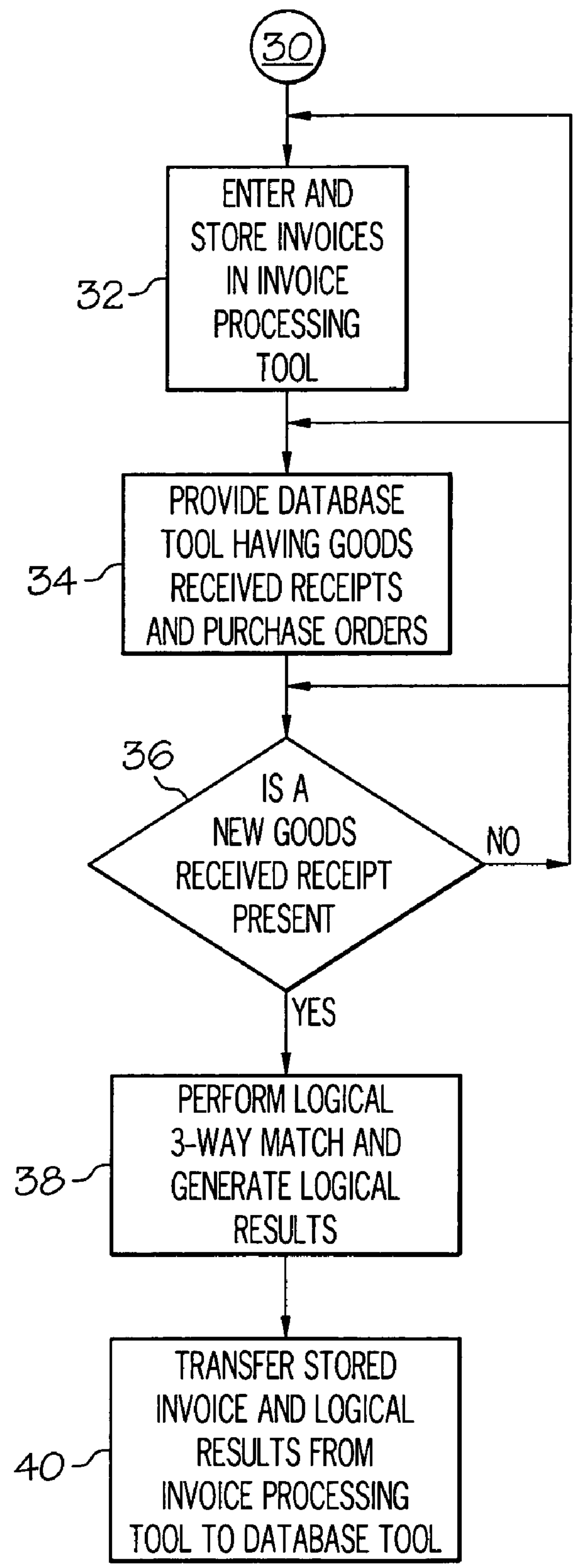
FIG. 2 is a flowchart of the system of the invention.
Figure 3:
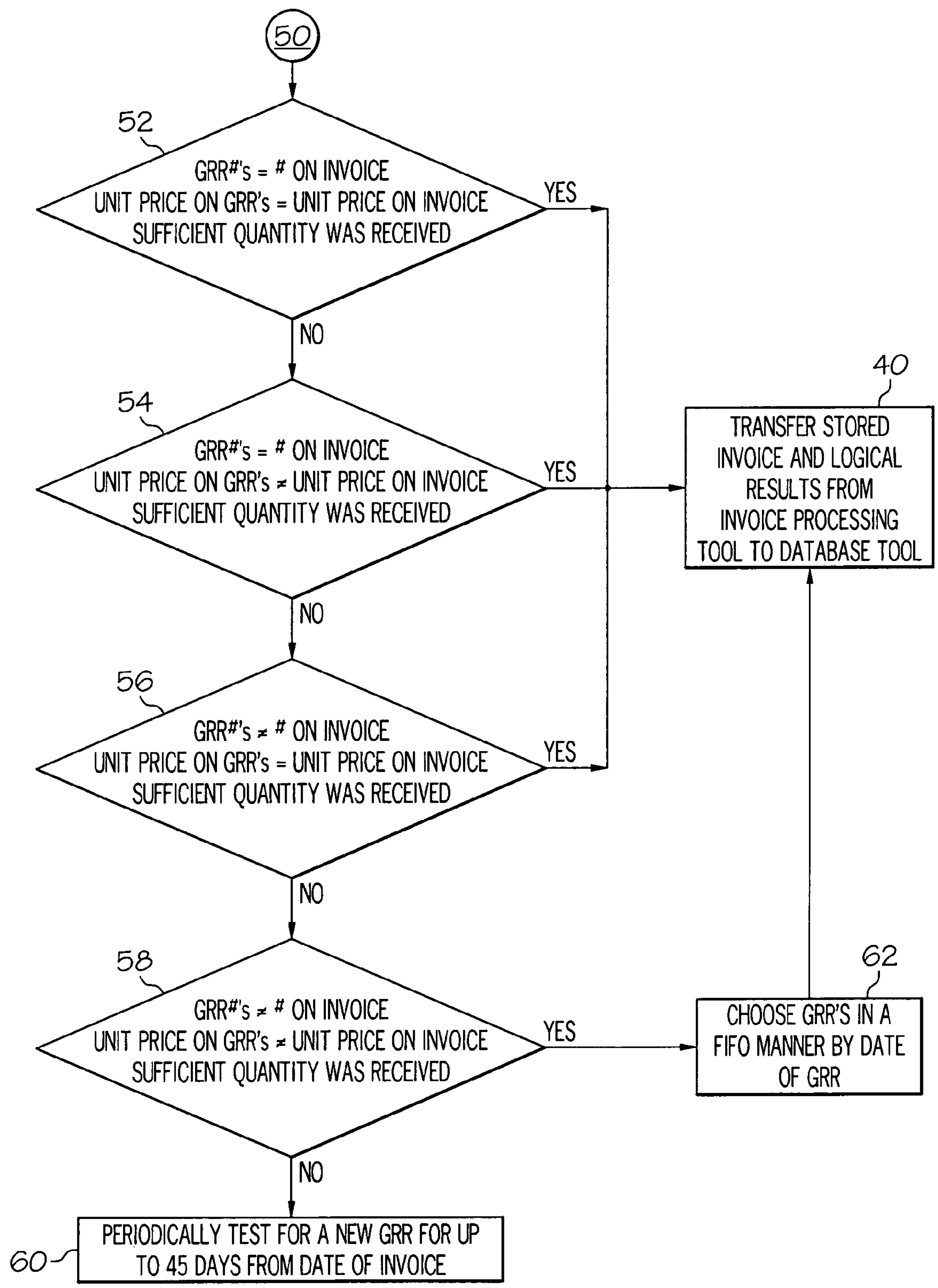
FIG. 3 illustrates a preferred way to preform a three-way match.

In FIG. 2 there is shown a flowchart describing the process steps in accordance with another embodiment of the invention. Starting at box 30, invoices are entered and stored in step 32 in an invoice processing tool. Various devices and structures for entering and storing have been described above. The invoice entered may comprise data such as company code, document currency, vendor number, document number, document date, items, and item amounts. In step 34 a database tool having goods received receipts and purchase orders is provided. Such tools are described above. In step 36 the database tool is periodically inquired to determine whether a new goods received receipt is present. If one or more are present, then in step 38 a logical three-way match is performed for each stored invoice. One way of performing a three-way match shown in FIG. 3 is described below. When a match is found, the invoice and logical results are transferred from the invoice processing tool to the database tool in step 40.

In FIG. 3 there is shown a detailed flowchart depicting one way of performing a logical three-way match of step 38 in FIG. 2. The process starts at box 50 after it has been determined that a new GRR is present in the database tool. In step 52, for each invoice, it is determined whether there is one or more GRR's having the same number e.g. delivery note number (#) as the delivery note number on the invoice. Also does the unit price on the GRR(s) equal the unit price specified on the invoice. Finally is the total product quantity on the one or more GRR's sufficient to satisfy the product quantity listed on the invoice. If all three conditions are satisfied, this is the ideal case and the stored invoice is transferred from the invoice processing tool to the database tool in step 40 as previously described. In addition, the logical results indicating all three conditions were satisfied are also transferred.

When handling a large number of orders, receipts, and invoices it frequently happens that not all three conditions are satisfied. In step 54, for example, it is determined that the unit price shown on one or more GRR does not equal the unit price on the invoice, but everything else is satisfied. Unit prices may not match for many reasons including a change in price upward or downward between the time units were shipped by the supplier and the invoice was sent. There may be a clerical error or perhaps a price change was not communicated to all parties at the same time. Whatever, the reason for the unit price difference, the invoice and logical results are again transferred from the invoice processing tool to the database tool in step 40. In this case the logical results will indicate to the buyer in purchasing that a price reconciliation must be performed as is customarily done and the supplier paid.

In step 56, a third pass of the logical three-way notch determines that the number on one or more GRR(s) does not match the number on the invoice however all remaining conditions are satisfied. Again, a transfer of the invoice and logical results is performed in step 40.

In step 58, at least one GRR number and at least one GRR unit price does not match the invoice, however the total product quantity is sufficient to satisfy the quantity indicated on the invoice. In this case the invoice processing tool chooses GRR's by date to satisfy the quantity indicated on the invoice in step 62 and then transfers the invoice and logical results in step 40. The logical results include information on which GRR's were selected in step 62.

Finally, if none of the matches in steps 52, 54, 56 or 58 are satisfied, then the matching tool will loop back and periodically inquire the database tool of determine if a new GRR is present in step 60. In a preferred embodiment, this periodic inquiring may continue for up to 45 days after which the invoice will be removed from the invoice processing tool and returned to the supplier.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of processing invoices, the method comprising the steps of:

providing one or more unmatched invoices;

periodically inquiring to determine if a new goods received receipt (GRR) is present in a computerized database tool;

performing a logical three-way match between the GRR and each of the unmatched invoices with a processor, wherein the logical three-way match includes:

comparing a GRR number on the unmatched invoice with a GRR number on the GRR;

comparing a unit price on the unmatched invoice with a unit price on the GRR;

comparing a quantity on the unmatched invoice with a quantity on the GRR;

finding a match if one of the following is true:

(1) the GRR numbers match, the unit prices match, and the quantity on the GRR is greater than or equal to the quantity on the unmatched invoice;

(2) no match was found for (1), and the GRR numbers match and the quantity on the GRR is greater than or equal to the quantity on the unmatched invoice;

(3) no match was found for (1) and (2), and the unit prices match and the quantity on the GRR is greater than or equal to the quantity on the unmatched invoice; and (4) no match was found for (1), (2) and (3), and the quantity on the GRR is greater than or equal to the quantity on the unmatched invoice and the unmatched invoice is the oldest unmatched invoice;

generating a logical result of each logical three-way match; and transferring a matched invoice and a corresponding logical three-way match to the database tool.

2. The method of claim 1, further comprising removing an unmatched invoice after a predetermined period of time.

3. The method of claim 1, further comprising:

storing one or more unmatched invoices in a computer memory; and storing each GRR in a database.

4. The method of claim 3, further comprising storing purchase orders in the database.

5. The method of claim 1, further comprising entering an unmatched invoice into a computer memory using an invoice processing tool.

6. A computer program product for processing invoices, said computer program product comprising:

a computer readable medium comprising computer program code for performing the following steps;

entering and storing one or more unmatched invoices in an invoice processing tool;

providing a database tool having one or more goods received receipts stored in a database;

periodically inquiring to determine if a new goods received receipt (GRR) is present;

performing a logical three-way match between the GRR and each of the one or more unmatched invoices, wherein the logical three-way match includes:

comparing a GRR number on the unmatched invoice with a GRR number on the GRR;

comparing a unit price on the unmatched invoice with a unit price on the GRR;

comparing a quantity on the unmatched invoice with a quantity on the GRR; and finding a match if one of the following is true:

(1) the GRR numbers match, the unit prices match, and the quantity on the GRR is greater than or equal to the quantity on the unmatched invoice;

(2) no match was found for (1), and the GRR numbers match and the quantity on the GRR is greater than or equal to the quantity on the unmatched invoice;

(3) no match was found for (1) and (2), and the unit prices match and the quantity on the GRR is greater than or equal to the quantity on the unmatched invoice; and (4) no match was found for (1), (2) and (3), and the quantity on the GRR is greater than or equal to the quantity on the unmatched invoice and the unmatched invoice is the oldest unmatched invoice;

generating a logical result of each logical three-way match; and transferring a matched invoice and a corresponding logical result to the database tool.

7. The computer program product of claim 6, wherein the computer readable medium further comprises computer program code for performing the following step: storing purchase orders in the database.

8. Computer executable process steps each step performed by a computer, for processing invoices, comprising;

a step to periodically inquire to determine if a new goods received receipt (GRR) is present;

a step to perform a logical three-way match between the GRR and an unmatched invoice, wherein the logical three-way match includes:

a step to compare a GRR number on the unmatched invoice with a GRR number on the GRR;

a step to compare a unit price on the unmatched invoice with a unit price on the GRR;

a step to compare a quantity on the unmatched invoice with a quantity on the GRR;

a step to obtain a logical match result if one of the following is true:

(1) the GRR numbers match, the unit prices match, and the quantity on the GRR is greater than or equal to the quantity on the unmatched invoice;

(2) no match was found for (1), and the GRR numbers match and the quantity on the GRR is greater than or equal to the quantity on the unmatched invoice;

(3) no match was found for (1) and (2), and the unit prices match and the quantity on the GRR is greater than or equal to the quantity on the unmatched invoice; and (4) no match was found for (1), (2) and (3), and the quantity on the GRR is greater than or equal to the quantity on the unmatched invoice and the unmatched invoice is the oldest unmatched invoice;

a step to generate a logical result of each logical three-way match; and a step to transfer a matched invoice and a corresponding logical result to the database tool.

9. The computer executable process steps of claim 8, further comprising a step to store purchase orders in the database.

* * * * *

UNITED STATES PATENT AND TRADEMARK OFFICE

CERTIFICATE OF CORRECTION

PATENT NO. : 6,928,411 B1
APPLICATION NO. : 09/409831
DATED : August 9, 2005
INVENTOR(S) : Vincent P. Fox et al.

It is certified that error appears in the above-identified patent and that said Letters Patent is hereby corrected as shown below:

On Title page item 56

In the References Cited:

Add --5,717,989 02/1998 Tozzoli et al.--

Signed and Sealed this

Sixth Day of March, 2007

JON W. DUDAS
*Director of the United States Patent and Trademark Office*